(12) United States Patent
Donderici et al.

(10) Patent No.: US 9,823,380 B2
(45) Date of Patent: Nov. 21, 2017

(54) COMPENSATED BOREHOLE AND PIPE SURVEY TOOL WITH CONFORMABLE SENSORS

(71) Applicant: Halliburton Energy Services, Inc., Houston, TX (US)

(72) Inventors: Burkay Donderici, Houston, TX (US); Luis San Martin, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 160 days.

(21) Appl. No.: 14/906,819

(22) PCT Filed: Sep. 30, 2014

(86) PCT No.: PCT/US2014/058306
§ 371 (c)(1),
(2) Date: Jan. 21, 2016

(87) PCT Pub. No.: WO2015/050867
PCT Pub. Date: Apr. 9, 2015

(65) Prior Publication Data
US 2016/0154134 A1  Jun. 2, 2016

Related U.S. Application Data

(60) Provisional application No. 61/886,169, filed on Oct. 3, 2013.

(51) Int. Cl.
*G01V 3/26* (2006.01)
*G01V 3/18* (2006.01)
(Continued)

(52) U.S. Cl.
CPC ............... *G01V 3/26* (2013.01); *E21B 47/00* (2013.01); *E21B 47/0905* (2013.01); *G01V 3/18* (2013.01)

(58) Field of Classification Search
CPC .......... G01V 3/26; E21B 47/00; E21B 47/065
See application file for complete search history.

(56) References Cited

U.S. PATENT DOCUMENTS 4,292,589 A   9/1981 Bonner
5,869,767 A   2/1999 Hayward et al.
(Continued)

OTHER PUBLICATIONS

International Preliminary Report on Patentability issued in related Application No. PCT/US2014/058306, dated Apr. 14, 2016 (13 pages).

(Continued)

*Primary Examiner* — Giovanni Astacio-Oquendo
*Assistant Examiner* — Alvaro Fortich
(74) *Attorney, Agent, or Firm* — Benjamin Fite; Baker Botts L.L.P.

(57) ABSTRACT

An example method includes positioning a first conformable sensor proximate to a downhole element. The first conformable sensor may include a flexible material, with first and second transmitters and first and second receivers coupled to the flexible material. A first signal may be generated using the first transmitter and a second signal using the second transmitter. A first response of the downhole element to the first signal and a second response of the downhole element to the second signal may be measured at the first receiver. A third response of the downhole element to the first signal and a fourth response of the downhole element to the second signal may be measured at the second receiver. At least the first, second, third, and fourth responses may be combined into a compensated response of the downhole element. The compensated response may be processed to determine a parameter of the downhole element.

20 Claims, 7 Drawing Sheets

(51) Int. Cl.
*E21B 47/09* (2012.01)
*E21B 47/00* (2012.01)

(56) References Cited

U.S. PATENT DOCUMENTS

| | | | | |
|---|---|---|---|---|
| 2001/0004212 | A1* | 6/2001 | Omeragic | G01V 3/28 324/338 |
| 2002/0101242 | A1 | 8/2002 | Bittar | |
| 2002/0167418 | A1 | 11/2002 | Goswami et al. | |
| 2007/0284112 | A1 | 12/2007 | Magne et al. | |
| 2008/0291048 | A1* | 11/2008 | Huiszoon | E21B 47/082 340/856.3 |
| 2010/0265795 | A1* | 10/2010 | Johnson | G01V 1/44 367/32 |

OTHER PUBLICATIONS

International Search Report and Written Opinion issued in related PCT Application No. PCT/US2014/058306 dated Jan. 14, 2015, 16 pages.

Neil Goldfine, "Surface-Mounted Eddy-Current Sensors for On-Line Monitoring of Fatigue Tests and for Aircraft Health Monitoring", Second Joint NASA/FAA/DoD Conference on Aging Aircraft, Aug. 1998.

Neil Goldfine et al, "Conformable Eddy-Current Sensors and Arrays for Fleetwide Gas Turbine Component Quality Assesment", ASME Journal of Engineering for Gas Turbines and Power, vol. 124, No. 4, pp. 904-909, Oct. 2002.

Neil Goldfine, "MWM-Array Eddy Current Sensors for Detection of Cracks in Regions with Fretting Damage", ASNT Materials Evaluation, Jul. 2002, vol. 60, No. 7.

\* cited by examiner

COMPENSATED BOREHOLE AND PIPE SURVEY TOOL WITH CONFORMABLE SENSORS

CROSS REFERENCE TO RELATED APPLICATIONS

The present application claims priority to U.S. provisional No. 61/886,169, filed Oct. 3, 2013 and titled "Compensated Borehole and Pipe Survey Tool with Conformable Sensors," and is a U.S. National Stage Application of International Application No. PCT/US2014/058306 filed Sep. 30, 2014, both of which are incorporated herein by reference in their entirety for all purposes.

BACKGROUND

The present disclosure relates generally to downhole drilling operations and, more particularly, to a compensated borehole and pipe survey tool with conformable sensors. Hydrocarbons, such as oil and gas, are commonly obtained from subterranean formations that may be located onshore or offshore. The development of subterranean operations and the processes involved in removing hydrocarbons from a subterranean formation are complex. Typically, subterranean operations involve a number of different steps such as, for example, drilling a wellbore at a desired well site, treating the wellbore to optimize production of hydrocarbons, and performing the necessary steps to produce and process the hydrocarbons from the subterranean formation.

In certain operations, the wellbore may be "cased," meaning that a metal pipe is inserted in the wellbore and secured using a cement layer. Over time these pipes may develop flaws such as corrosion that may affect the operation of the wellbore over time. Other types of flaws such as small fractures may be present in open or uncased wellbores. In certain instances, these flaws may be very small, such that typical downhole measurements tools have difficulty detecting them.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features.

Figure 1:
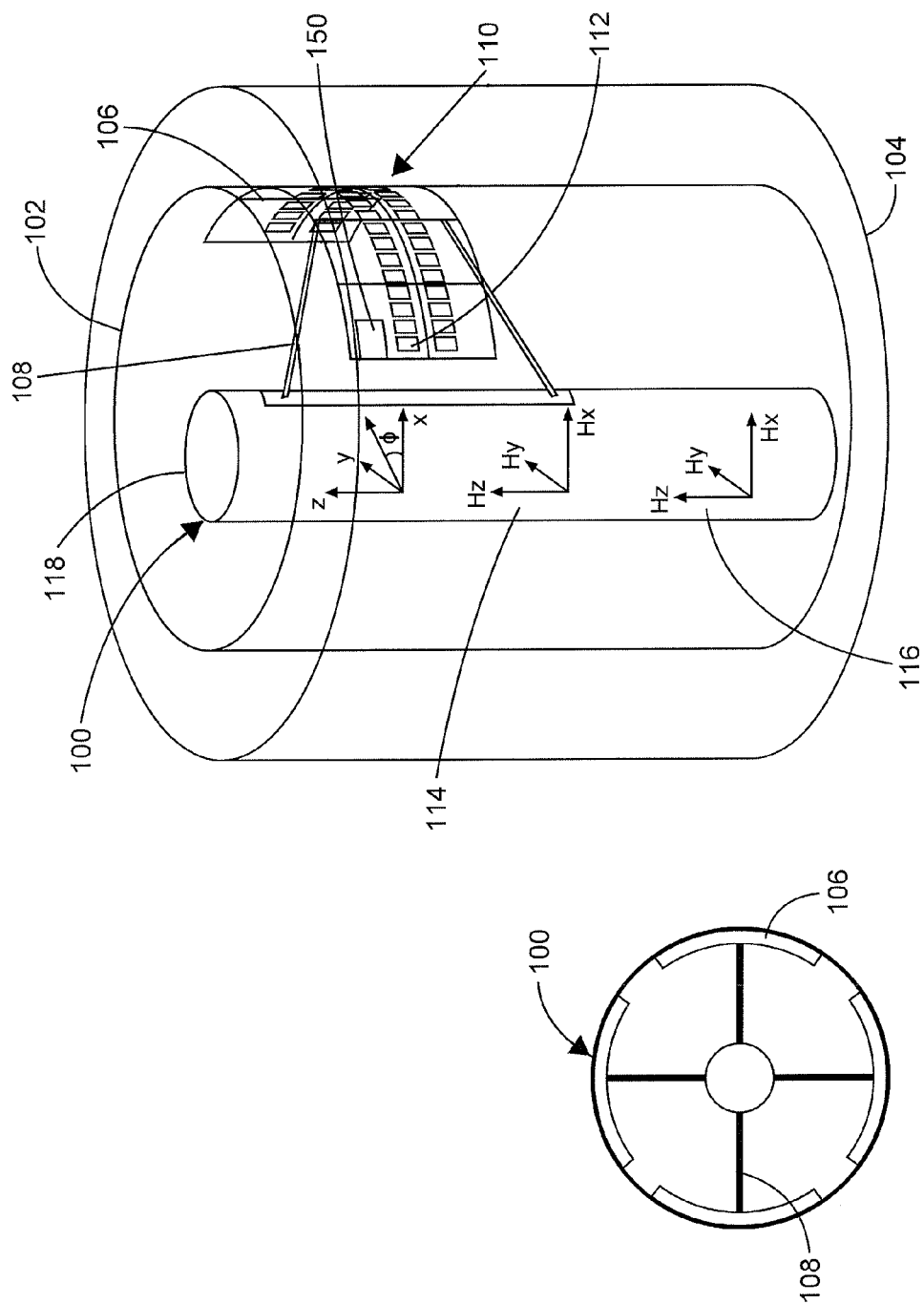
FIG. 1 is a diagram of an example downhole tool with conformable sensors, according to aspects of the present disclosure.

While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

The present disclosure relates generally to downhole drilling operations and, more particularly, to compensated borehole and pipe survey tool with conformable sensors.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components. It may also include one or more interface units capable of transmitting one or more signals to a controller, actuator, or like device.

For the purposes of this disclosure, computer-readable media may include any instrumentality or aggregation of instrumentalities that may retain data and/or instructions for a period of time. Computer-readable media may include, for example, without limitation, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing.

Illustrative embodiments of the present disclosure are described in detail herein. In the interest of clarity, not all features of an actual implementation may be described in this specification. It will of course be appreciated that in the development of any such actual embodiment, numerous implementation-specific decisions are made to achieve the specific implementation goals, which will vary from one implementation to another. Moreover, it will be appreciated that such a development effort might be complex and time-consuming, but would nevertheless be a routine undertaking for those of ordinary skill in the art having the benefit of the present disclosure.

To facilitate a better understanding of the present disclosure, the following examples of certain embodiments are given. In no way should the following examples be read to limit, or define, the scope of the disclosure. Embodiments of the present disclosure may be applicable to horizontal, vertical, deviated, or otherwise nonlinear wellbores in any type of subterranean formation. Embodiments may be applicable to injection wells as well as production wells, including hydrocarbon wells. Embodiments may be implemented using a tool that is made suitable for testing, retrieval and sampling along sections of the formation. Embodiments may be implemented with tools that, for example, may be conveyed through a flow passage in tubular string or using a wireline, slickline, coiled tubing, downhole robot or the like.

The terms "couple" or "couples" as used herein are intended to mean either an indirect or a direct connection. Thus, if a first device couples to a second device, that connection may be through a direct connection or through an indirect mechanical or electrical connection via other devices and connections. Similarly, the term "communicatively coupled" as used herein is intended to mean either a direct or an indirect communication connection. Such connection may be a wired or wireless connection such as, for example, Ethernet or LAN. Such wired and wireless connections are well known to those of ordinary skill in the art and will therefore not be discussed in detail herein. Thus, if a first device communicatively couples to a second device, that connection may be through a direct connection, or through an indirect communication connection via other devices and connections.

Modern petroleum drilling and production operations demand information relating to parameters and conditions downhole. Several methods exist for downhole information collection, including logging-while-drilling ("LWD") and measurement-while-drilling ("MWD"). In LWD, data is typically collected during the drilling process, thereby avoiding any need to remove the drilling assembly to insert a wireline logging tool. LWD consequently allows the driller to make accurate real-time modifications or corrections to optimize performance while minimizing down time. MWD is the term for measuring conditions downhole concerning the movement and location of the drilling assembly while the drilling continues. LWD concentrates more on formation parameter measurement. While distinctions between MWD and LWD may exist, the terms MWD and LWD often are used interchangeably. For the purposes of this disclosure, the term LWD will be used with the understanding that this term encompasses both the collection of formation parameters and the collection of information relating to the movement and position of the drilling assembly.

Figure 7:
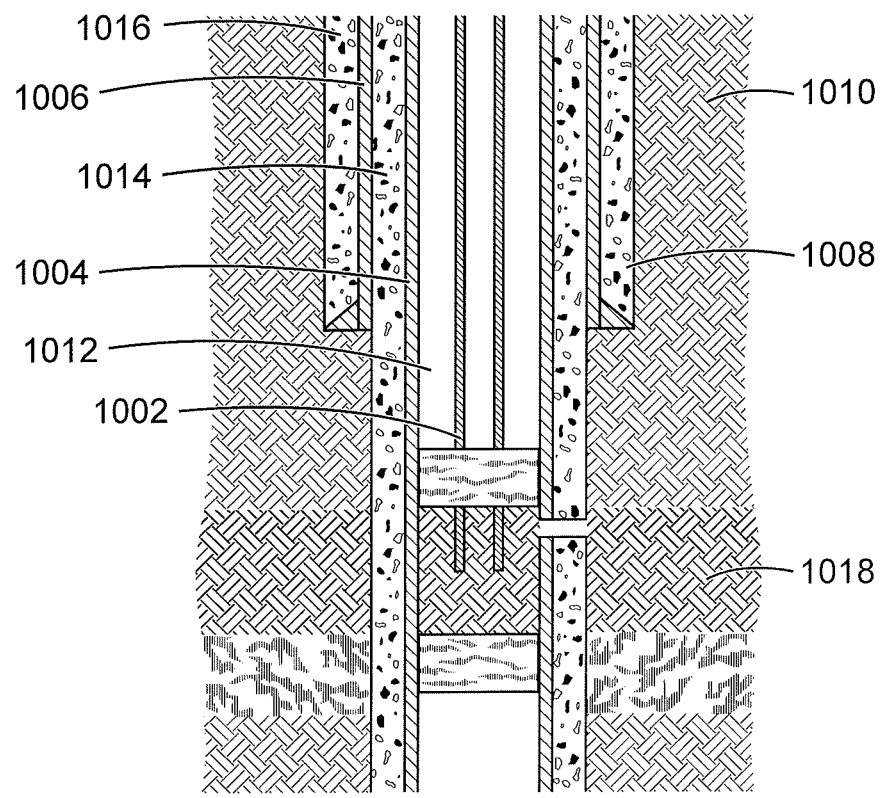
FIG. 7 is a diagram of an example production environment with multiple, concentric casings.

Hydrocarbons may be trapped in porous rock formations thousands of feet below the surface. Recovering the hydrocarbons typically requires drilling a borehole into the porous rock formation so that the hydrocarbons may be pumped to the surface. Metal pipes, referred to as casings, may be secured within the borehole as part of the hydrocarbon recovery operation. FIG. 7 is a diagram of an example production environment and illustrates casings 1002, 1004, and 1006 disposed within a borehole 1008 in a rock formation 1010. The casings 1002-1006 may be concentric or nearly concentric and secured within the borehole 1008 and each other through cement layers 1012, 1014, and 1016. The center casing 102 may comprise a production casing where hydrocarbon from the formation strata 1018 is received at the surface (not shown).

The casings 1002-1006 may serve numerous purposes within a production and drilling environment, including preventing the borehole 1008 from collapsing after it is drilled and while it is being drilling, protecting a water table in the formation 1010 from contamination, and maintaining pressure within the borehole 1008. Accordingly, damage to the integrity of the casings 1002-1006 is problematic. Common damage to the casings includes crack and corrosion, which can be an indication of a defective cement bond between a casing and the borehole wall.

According to aspects of the present disclosure, a downhole tool with at least one conformable sensor may be placed proximate to downhole elements in either an open hole (non-cased) environment, or in a cased environment, and may be used to inspect, detect, and/or visualize the downhole elements. Example downhole elements include the boreholes, formations, and pipes or casing disposed within the borehole. As used herein, conformable sensors may comprise planar sensors that are printed or disposed on a flexible material that can conform to the shape of a surface with which it is in contact, and may produce high-resolution, azimuthally sensitive measurements that can be used to visualize that surface. In certain aspects of the present disclosure In certain drilling operations, downhole temperature and pressure conditions may affect the conformable sensors and other aspects of the downhole tool. For example, downhole temperatures may alter the electronics associated with the conformable sensors, causing errors in the resulting measurements. Example processing techniques are described herein to compensate for the downhole conditions to reduce errors in the measurements. Additionally, the conformable sensors may be arranged on the downhole tool to facilitate or accommodate the compensation calculations.

FIG. 1 is a diagram that shows two views of an example downhole tool 100 with conformable sensors, according to aspects of the present disclosure. The downhole tool 100 is shown deployed in concentric pipes 102 and 104, such as in a cased environment. In certain embodiments, the downhole tool 100 may comprise a wireline survey or measurement tool that can be introduced into an open hole (non-cased) environment, a cased environment, or within the bore of a drill string in a conventional drilling assembly. In certain embodiments, the downhole tool 100 may be included in a LWD/MWD segment of a bottom hole assembly (BHA) in a conventional drilling assembly. The tool 100 may be physically and/or communicably coupled to a control unit (not shown) at the surface through a wireline or slickline, or any other conveyance, or through a downhole telemetry systems, such as a mud pulse telemetry system. The tool 100 may also comprise a control unit that is communicably coupled to the conformable sensor 112 of the tool. As used herein, a control unit may include an information handling system or any other device that contains at least one processor communicably coupled to a non-transitory computer readable memory device containing a set of instructions that when executed by the processor, cause it to perform certain actions. Example processors include microprocessors, microcontrollers, digital signal processors (DSP), application specific integrated circuits (ASIC), or any other digital or analog circuitry configured to interpret and/or execute program instructions and/or process data.

At least one conformable sensor 112 may be coupled to a tool body 118 of the downhole tool 100. A conformable sensor may include primary windings or transmitters having extended portions for creating an electromagnetic (EM) field in a target, in this case the pipe 102, and secondary windings or receivers within the primary winding for measuring the current response of the target to the generated EM field. The measured current response may be processed to identify physical and electrical parameters of the target and the parameters may be visualized to identify features of the target, as will be described below. The resolution of the measurements taken by the conformable sensor 112 increases as the "stand-off" distance between the sensor 112 and the target decreases.

In the embodiment shown, the conformable sensor 112 is one of an array of conformable sensors 110 disposed on a pad 106 that is coupled to and extendable from the tool body 118 through spring mechanisms or motorized arms 108 to contact the pipe 102. The spring mechanisms or motorized arms 108 may similarly establish contact between the pad 106 and a borehole wall in an open hole environment. The elasticity of the pad 106 and tension in the arm 108 may be designed in such a way that the pad 106 will substantially deform to the shape of the pipe 102, decreasing the stand off distance between the sensor 112 and pipe 102 and increasing the resolution of the resulting measurements. Other pads similar to pad 106 may be arranged on different sides of the tool 100 to mechanically balance the tool 100 within the pipe 102. In other embodiments, expandable arms may be used opposite the pad 106 to mechanically balance the tool 100. In certain embodiments, the array 110 of conformable sensors may be arranged on the pad 106 to perform sensing at different azimuthal positions with respect to the tool body 118. In embodiments where multiple pads are used, each pad may include an array of conformable sensors to perform sensing at different azimuthal positions, and the pads may be arranged with respect to the tool body 118 such that there is full 360 degree coverage around the tool 100, where one pad covers one set of angles, and other stations cover other sets, providing full coverage. Other types of sensors, such as acoustic sensor 150, may be coupled to the pad 106.

As stated above, the conformable sensor 112 may include at least one portion that functions as a transmitter and generate electromagnetic (EM) fields in a target, such as the pipe 102, and at least one portion that functions as a receiver that receives and measures the current responses of the target to the generated EM fields. In certain embodiments, in addition to the conformable sensors 212, the downhole tool 100 may comprise separate transmitters 114 or receivers 116 mounted on the tool body 118. These additional transmitters 114 or receivers 116 may be inductive-type antennas, realized with coils, solenoids or rotating or moving magnets. In certain embodiments, measurements may be taken with any combination of the transmitter 114, the receiver 112, and the transmitters and receivers within the conformable sensor 112. Notably, when the transmitter is farther away from the receiver, the depth of investigation increases but the measurement resolution decreases.

In use, the downhole tool 100 may generate high-resolution measurements of the pipe 102 by placing the pad 106 in contact with the pipe 102 and transmitting a time-varying EM signal from a transmitter of the conformable sensor 112. The signal may generate eddy currents in the pipe 102. The eddy currents may generate secondary currents that contain information about the features of the pipe 102, and the secondary currents may be measured at some or all of the receivers of the conformable sensor 112. Conversely, the downhole tool 100 may generate low resolution measurements of the pipe 104 by transmitting a time-varying EM signal from transmitter 114 and measuring the current responses of the pipe 104 at one or more receivers of the conformable sensor 112.

Figure 2:
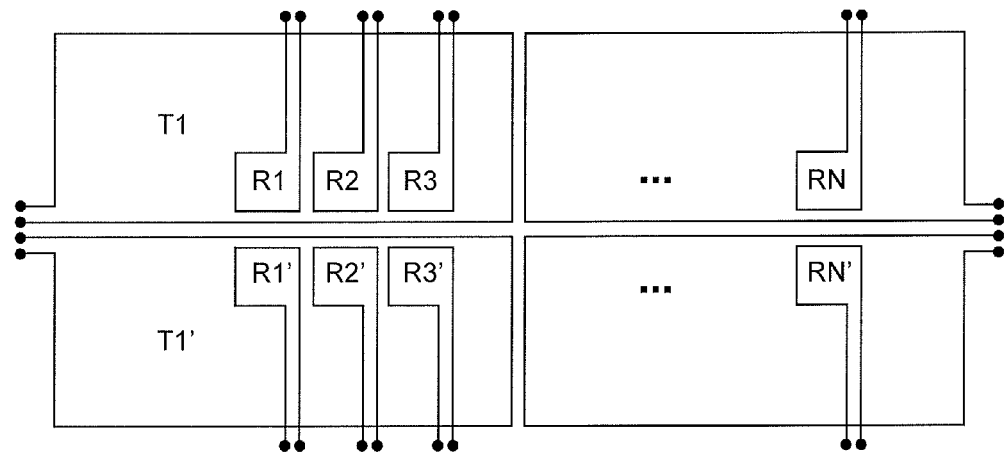
FIG. 2 is a diagram of example antenna windings for a conformable sensor, according to aspects of the present disclosure.

FIG. 2 is a diagram of example antenna windings for a conformable sensor, according to aspects of the present disclosure. The windings shown may comprise the windings for a single conformable sensor and may be formed by circuit printing or other deposition methods on a flexible surface (not shown). As can be seen, the windings include transmitters T1 and T1' and two arrays of receivers R1-RN and R1'-RN1. The transmitters T1 and T1' may comprise primary windings, while the two arrays of receivers R1-RN and R1'-RN1. In the embodiment shown, the two arrays of receivers R1-RN and R1'-RN' may be azimuthally aligned, forming an array of receiver pairs R1 and R1', R2 and R2', etc. Likewise, the transmitters T1 and T1' may be azimuthally aligned to form a transmitter pair. Although one example of antenna windings for a conformable sensor is shown in FIG. 2, other configurations are possible. For example, the size, number, and relative positions of the transmitters T1 and T1' and the two arrays of receivers R1-RN and R1'-RN'. may be altered, and the functionality of the receivers and transmitters can be switched, e.g., T1 may be a receiver and R3 may be a transmitter.

Ports of the transmitting and receiving windings (shown as circles) may be electrically connected to transmitter and receiver boards (not shown) that cause one or more of the transmitters T1 and T1' to generate a signal in a target, and each of the receiver pairs R1-RN and R1'-RN' to separately measure an amplitude and phase of the response of the target to the signal. In certain embodiments, the combinations of transmitters and receivers used to generate EM signals and measure current responses may be varied dynamically by a control unit coupled to the transmitters T1 and T1' and receiver pairs R1-RN and R1'-RN'. As will be described below, the alignment of the transmitters T1 and T1' and receivers R1-RN and R1'-RN' may facilitate measurement compensation calculations.

According to aspects of the present disclosure, the measured responses generated by downhole conformable sensors may be "compensated" to reduce or eliminate the effects of the downhole conditions and manufacturing constraints of the conformable sensors. Compensating for the downhole conditions and manufacturing constraints may produce an improved response from the conformable sensors, and a more accurate image of the target. Example compensation processes may be implemented in control units located in a borehole near or integrated into the downhole tool, or at the surface. In certain instances, the compensation processes may comprise steps corresponding to a set of instruction stored in a memory device of a control unit, where a processor of the control unit executes the set of instructions and performs the steps.

One example compensation process for a conformable sensor may utilize at least two transmitters and at least two receivers located at generally symmetric distances, which reduces the computation complexity of the compensation calculation. Using the windings of the conformable sensor shown in FIG. 2, for example, the two transmitters may comprise transmitters T1 and T1' and the two receivers may comprise the receivers R1 and R1'. At least four different measurements may be taken from signals generated by transmitters T1 and T1' and responses received by the receivers pair R1 and R1: a first measured response T1R1 from transmitter T1 to receiver R1, a third measured response T1R1' from transmitter T1 to receiver R1', a second measured response T1R1 from transmitter T1' to receiver R1, and a fourth measured response T1'R1' from transmitter T1' to receiver R1'. The measured responses may comprise complex voltages with both amplitudes and phases. A compensated response may be determined by multiplying the measured response T1R1 by T1'R1' and dividing the result by the product of measured response T1'R1' and measured response T1'R1. The compensated response may cancel any effects of the downhole temperature, pressure, and electromagnetic conditions of the receiver signals.

The following equations represent a generalized form of the compensation process described above, with transmitters Tx and Tx' and receivers Rx and Rx'. The actual measurement received from a transmitter and receiver pair may be represented by $V'^{\phi,z}_{TxRx}$, where $\phi$ corresponds to the azimuth of the measurements, z corresponds to the depth, and subscripts Tx and Rx identify the transmitter and receiver used to make the measurement. The actual measurement from a transmitter and receiver pair may be represented with the equation $V'^{\phi,z}_{TxRx} = C^{\phi,z}_{Tx} C^{\phi,z}_{Rx} V^{\phi,z}_{TxRx}$, where $C^{\phi,z}_{Tx}$ and $C^{\phi,z}_{Rx}$ correspond to the downhole effects on transmitter and receiver of the pair, respectively, and $V^{\phi,z}_{TxRx}$ corresponds to the ideal measurement from a receiver and transmitter pair.

As can be seen in equation (1) below, the downhole effects may be cancelled using a four term ratio of the received signals, producing a compensated signal $R(\phi,z)$, for each azimuth $\phi$ and depth z within the wellbore.

$$V'^{\phi,z}_{TxRx} = C^{\phi,z}_{Tx} C^{\phi,z}_{Rx} V^{\phi,z}_{TxRx} \tag{1}$$

$$R(\phi,z) = \frac{V'^{\phi,z}_{TxRx} V'^{\phi,z}_{Tx'Rx'}}{V'^{\phi,z}_{Tx'Rx} V'^{\phi,z}_{TxRx'}} = \frac{C^{\phi,z}_{Tx} C^{\phi,z}_{Rx} V^{\phi,z}_{TxRx} C^{\phi,z}_{Tx'} C^{\phi,z}_{Rx'} V^{\phi,z}_{Tx'Rx'}}{C^{\phi,z}_{Tx'} C^{\phi,z}_{Rx} V^{\phi,z}_{Tx'Rx} C^{\phi,z}_{Tx} C^{\phi,z}_{Rx'} V^{\phi,z}_{TxRx'}} = \frac{V^{\phi,z}_{TxRx} V^{\phi,z}_{Tx'Rx'}}{V^{\phi,z}_{Tx'Rx} V^{\phi,z}_{TxRx'}}$$

In certain embodiments, the compensated signal $R(\phi,z)$ may be recorded as a function of time to obtain a time-lapse measurement, indicated by $S(\phi_1, z_1, \phi_2, z_2)$ in equation (2) below. In general, a function $f$ can be used to standardize the compensated signal $R(\phi,z)$ before the subtraction as shown below.

$$S(\phi_1,z_1,\phi_2,z_2) = f(R(\phi_1,z_1)) - f(R(\phi_2,z_2)) \tag{2}$$

Example functions are shown below in equation (3).

$$f(x) = x$$

$$f(x) = \log(x)$$

$$f(x) = \ldots \tag{3}$$

Figure 3:
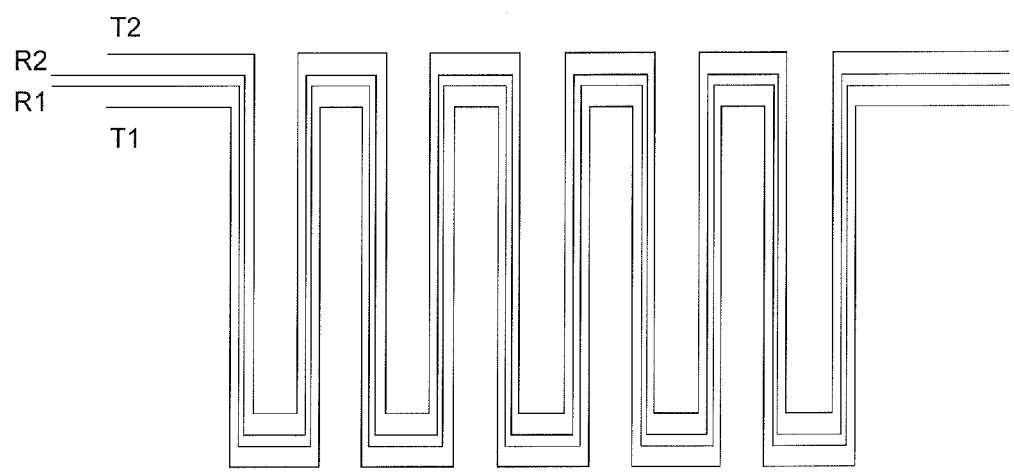
FIG. 3 is a diagram of other example antenna windings for a conformable sensor, according to aspects of the present disclosure.

FIG. 3 is a diagram of another example antenna winding for a conformable sensor, according to aspects of the present disclosure. In this example, the windings corresponding to transmitters T1 and T2 and the receivers R1 and R2 may follow a meandering pattern. These types of winding may be used to achieve excitation with a desired spatial frequency that is equivalent to the inverse of the periodicity of the windings, in this case the "wavelength" of the rectangular wave pattern. The transmitters T1 and T2 and receivers R1 and R2 follow the same meandering pattern in close proximity, with a generally symmetric spacing, which also may facilitate compensation calculations.

Figure 4:
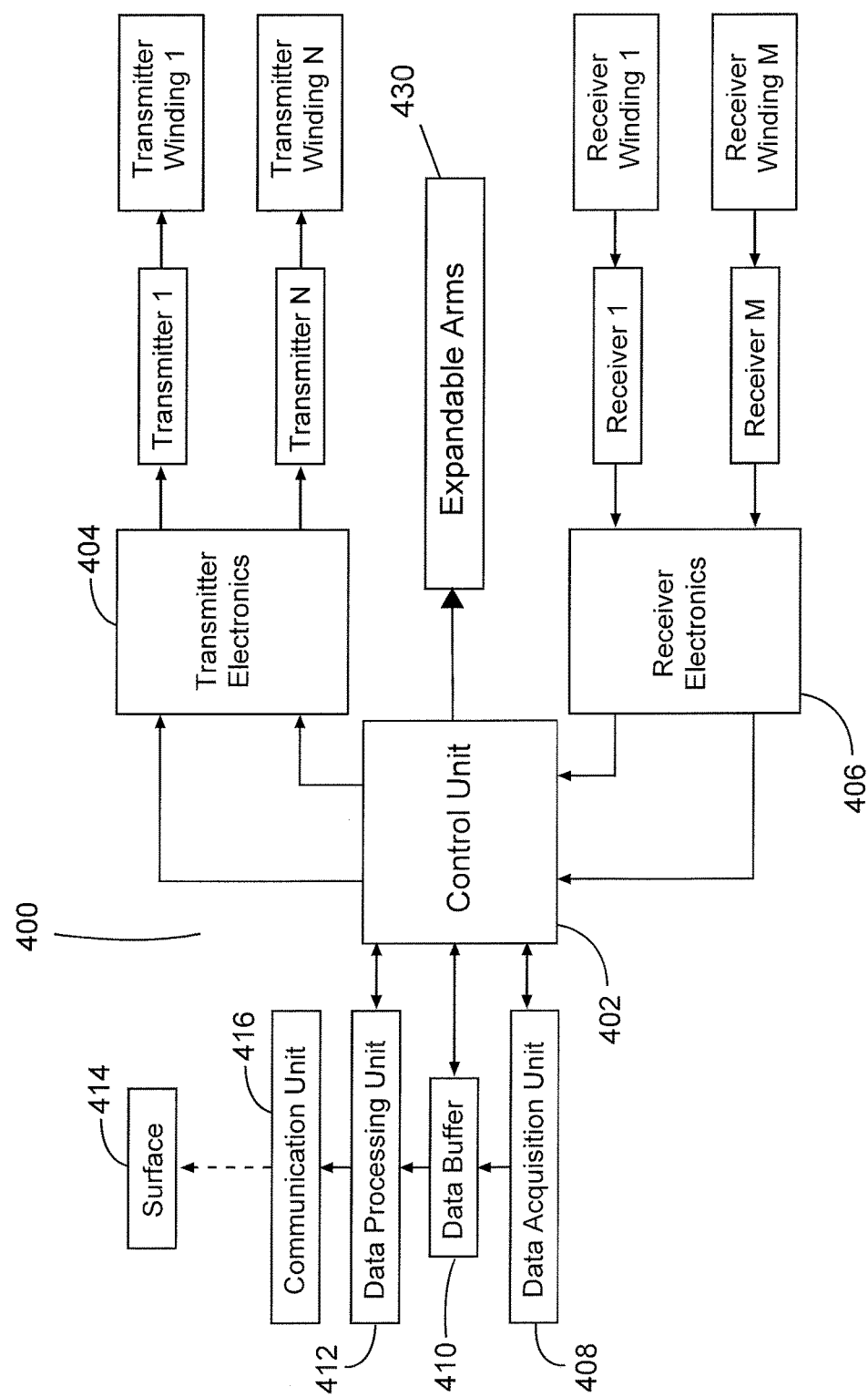
FIG. 4 is a diagram of an example control system for a downhole tool with conformable sensor array, according to aspects of the present disclosure.

In certain embodiments, a downhole tool with conformable sensors may comprise a control system to control when and how the EM signals are transmitted and the responses are measured. FIG. 4 is a diagram of an example control system 400 for a downhole tool with conformable sensors, according to aspects of the present disclosure. The system 400 comprises a control unit 402 that may function as the primary controller for the tool and may be communicably coupled to transmitters 1-N through transmitter electronics 404, to receivers 1-M through receiver electronics 406, and to mechanical, electrical or hydraulic elements 430 coupled to and configured to extend pads to which the transmitters 1-N and receivers 1-M coupled. At least one of the transmitters 1-N and receivers 1-M may comprise elements of a conformable sensor or an array of conformable sensors. The transmitter electronics 404 and receiver electronics 406 may comprise circuit boards to which some or all of the transmitters 1-N and receivers 1-M are coupled.

The control unit 402 may trigger the transmitter electronics 404 to generate a time-varying signal through one or more of the transmitters 1-N. The time-varying EM signal may be a sinusoidal signal, its phase and amplitude set at a desired value. As is described above, the signals generated through the transmitters 1-N may be coupled to and generate eddy currents in a downhole element is in immediate contact with the conformable sensors, as well as the downhole elements that are located away from the conformable sensors. The eddy currents may generate secondary currents that contain information about the downhole elements. The secondary currents generated by one or more of the transmitters 1-N of the conformable sensor array may be measured at the receivers 1-M. In the case of a frequency domain operation, the measurements from the receivers 1-M may be represented as voltage or current numbers in complex domain with real and imaginary parts, in phasor domain as amplitude and phase, or any other domain that can be obtained by analytical mapping from any of these domains. In the case of a time domain operation, the measurements from the receivers 1-M may be represented as magnitudes as a function of time which can be positive or negative. Results from time and frequency domain can be transferred from one to another by using Fourier transform or inverse Fourier transform.

The control unit 402 may receive the measurements from the receivers 1-N through the receiver electronics 406 and may transmit the measurements to the data acquisition unit 408. For a specific transmitter excitation, measurements from multiple receivers can be generated and received at the same time. Similarly, multiple transmitters 1-N can be excited at the same time and they can be time, frequency or jointly multiplexed for latter demultiplexing operation at the receivers. Upon reception at the data acquisition unit 408, the measurements may be digitized, stored in a data buffer 410, preprocessed at data processing unit 412, and sent to the surface 414 through a communication unit 416, which may comprise a downhole telemetry system.

In certain embodiments, the control unit 402 may select the combinations of the transmitters and receivers to use to measure the pipe responses. The control unit 402 may comprise a set of instructions and may generate control signals to the transmitter and receiver electronics based, at least in part, on the instructions. For example, the control center 302 may issue control signals to the transmitter and receivers to take different types of measurements within certain time periods. Example types of measurements include measurements with low-depth of investigations, medium depth of investigation, and high depth of investigation. Additionally, at least some of the compensation processing may be accomplished within the control unit. For example, the control center 402 and/or data processing unit 412 may implement a compensation process, similar to the one described above, before transmitting the measurements to the surface 414.

According to aspects of the present disclosure, the measurements from the conformable sensors may be aggregated and processed to determine physical or electrical parameters of the downhole element. In certain embodiments, aggregating and processing the measurements may comprise aggregating and processing the measurements using a control unit located either within the downhole tool or the surface above the downhole tool. When processed at the surface, the measurements may be communicated to the surface in real time, such as through a wireline, or stored in a downhole tool and later processed when the tool is retrieved to the surface.

In certain embodiments, processing the measurements may comprise processing the measurements using an inversion algorithm. The inversion algorithm may be specific to the environment in which the downhole tool is used (cased or open hole) and may be designed to identify different features unique to the environment. An inversion algorithm may be implemented as a set of instructions in control unit that, when executed by a processor of the control unit, may cause the processor to perform data calculations and manipulations necessary for the inversion algorithm.

Figure 5:
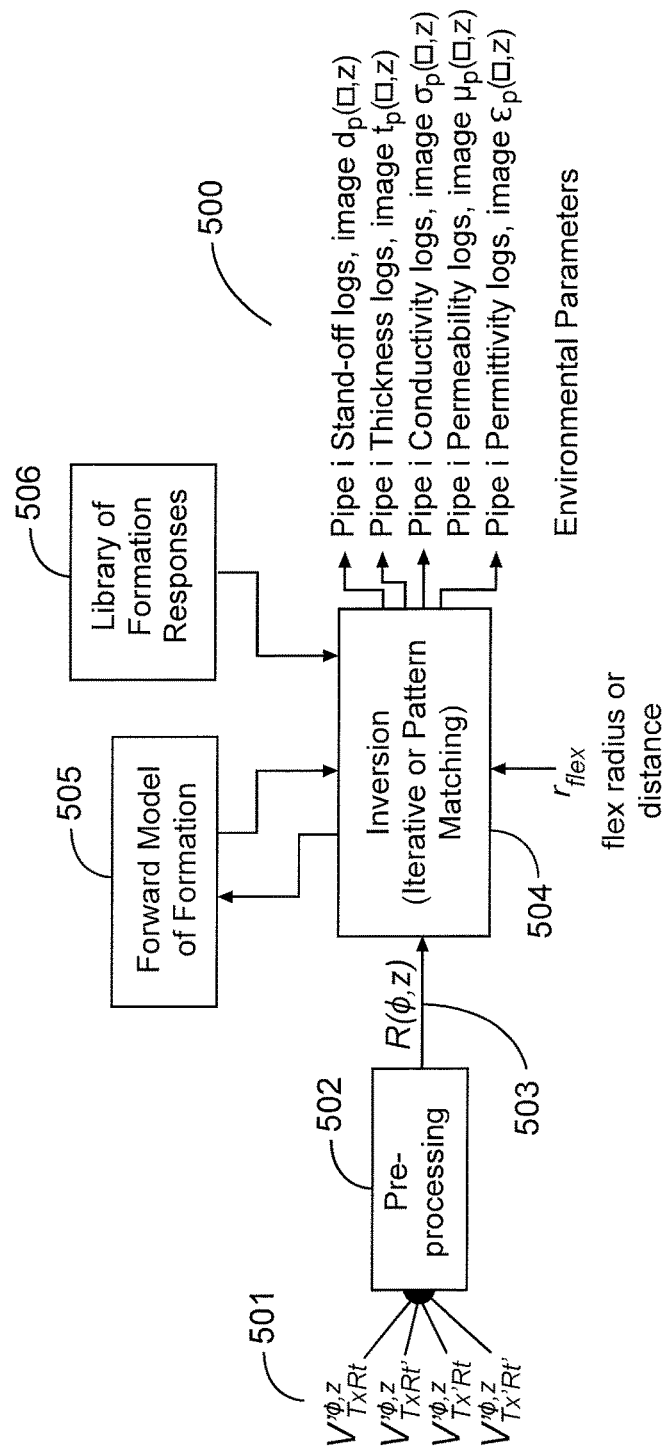
FIG. 5 is a block diagram of an example inversion algorithm for a downhole environment with one or more pipes, according to aspects of the present disclosure.

FIG. 5 is a block diagram on an example inversion algorithm for a downhole environment with one or more pipes, according to aspects of the present disclosure. Input signal 501 may comprise uncompensated measurements from the transmitters and receivers of one or more conformable sensors. The inversion algorithm may comprise a compensation block 502, which may receive the input signal 501 and produce a resulting compensated signal or measurements 503. The compensation block 502 may be located downhole in a downhole tool, or may be included as part of combined inversion algorithm in a surface control unit or information handling system. The compensation block 502 further may convert the measurements 501 between frequency to time domain, convert between complex-values to phase and amplitudes, and/or to remove noise by filtering in azimuth or depth.

The inversion algorithm further may comprise an inversion block 504, which may receive and process the compensated measurements 503 from the compensation block 502 to identify parameters of the downhole pipe or pipes. In certain embodiments, the inversion block 504 may receive a model 505 of a downhole environment with one or more pipes. The inversion block 504 may implement a cost function to identify parameters of the pipe or pipes that produce the minimum mismatch between the model 505 and the compensated signal 503, examples of which are described below. The cost function may be defined, for example, by utilizing least squares minimization through $L_2$ norm.

In certain embodiments, a library 506 of responses from other pipes and conformable sensors can be used instead of or in addition to the model 505. For example, the library 506 may be used if the parameter dimensions of the responses are low in number and also small in range, so that an accurate library can be calculated. If library 506 is used, a multi-dimensional interpolation can be used to obtain the pipe parameters closest to the compensated measurements 503.

The inversion block 504 may output one or more parameters of the pipe or pipes measured by the downhole tool. The parameters may comprise physical parameters, such as the stand-off distances between the sensors and the pipes and the thicknesses of the pipes, as well as electrical parameters of the pipes, such as conductivity, permeability, and permittivity. Visualizations of the parameters can be generated and used to identify features of the pipes, such as cracks or corrosion. Notably, because of the resolution of the conformable sensors, the resulting visualizations may have high-resolution and azimuthal sensitivity, indicating very small changes in the pipe parameters that correspond to very small features (on the order of 0.1 inches) on the pipe in direct contact with the conformable sensor. In a multi-pipe environment, where measurements are made on more than one pipe, the resulting measurements may be indexed to identify the corresponding pipe. However, the resolution of the measurements and resulting images for each pipe decreases the further the pipe is away from the conformable sensor, due to the increasing stand-off of between the pipe and the transmitters and receivers of the conformable sensors.

In certain embodiments, the downhole tool may make measurements as it is lowered to different depths within the casing, collecting more data points. In certain embodiments, these points can be combined to form a log of the casing, providing an image of the entire casing, rather than one axial portion. Alternatively, discrete azimuthal measurements from each depth can be combined to obtain an image of the casing. In addition to the pipe parameters, certain environmental parameters, such as temperature, pipe stresses, eccentricity of the tool in the borehole or pipe can be obtained.

Figure 6:
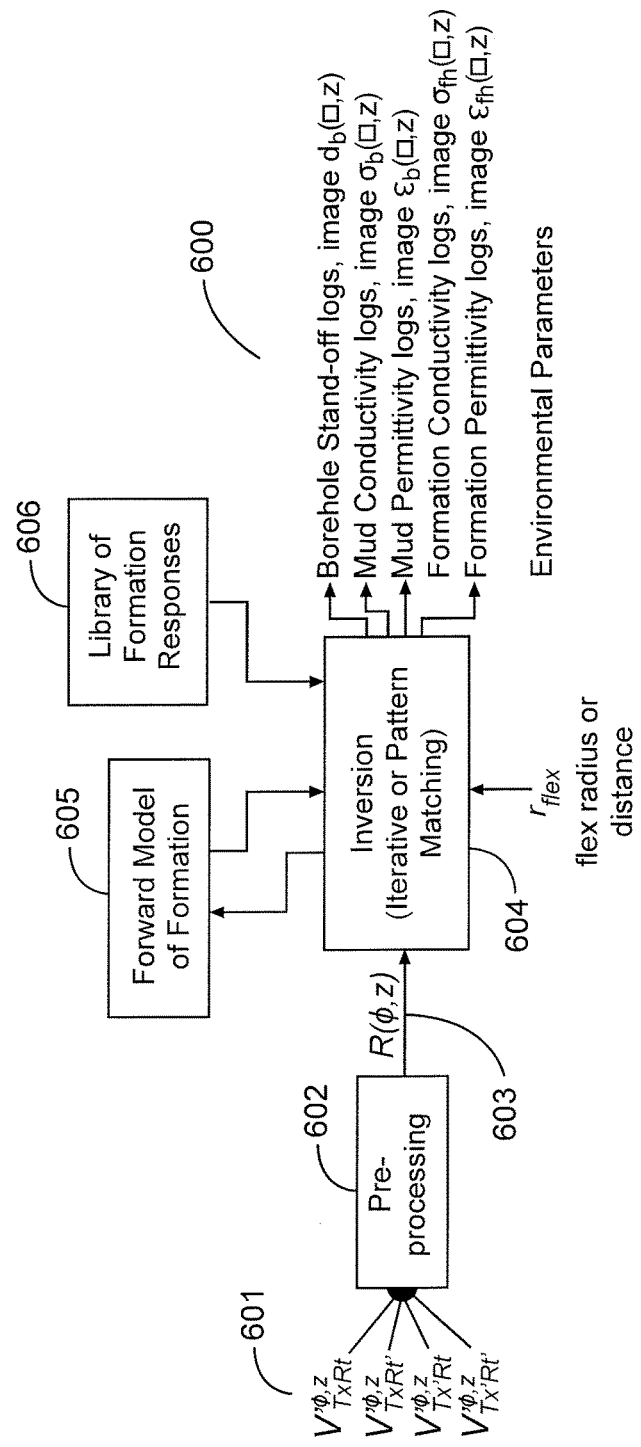
FIG. 6 is a block diagram of an example inversion algorithm for a downhole environment without pipes, according to aspects of the present disclosure.

FIG. 6 is a block diagram on an example inversion algorithm for a downhole environment without pipes (e.g., open hole), according to aspects of the present disclosure. As can be seen, the inversion algorithm 600 comprises similar features to inversion algorithm 500. For example, the input signals 601 and compensation block 602 may be similar to those described with respect to FIG. 5. The inversion block 604 may also be similar to the inversion block 504, processing the compensated signal 603 using a model 605 or library 606, with the model 605 and library 606 corresponding to a borehole rather than a casing.

The inversion block 604 may output parameters specific to an open hole environment. The parameters may comprise physical parameters, such as the stand-off distances between the sensors and the wall of the borehole, as well as electrical parameters formation or borehole, such at the conductivity or permittivity of the drilling mud layer on the wall of the borehole, or the conductivity and permittivity of the surrounding formation. Shallow measurements made using the conformable sensors may be used to estimate the electrical properties of any drilling fluid within the borehole, and also flushed zone and mud cake in the formation. In certain embodiments, larger sensors with lower resolution can be used to minimize the borehole rugosity effects. Like the inversion algorithm 500, the inversion algorithm 600 may output logs of parameters that may be visualized, and the visualization can be used to identify features of the borehole.

Figure 8:
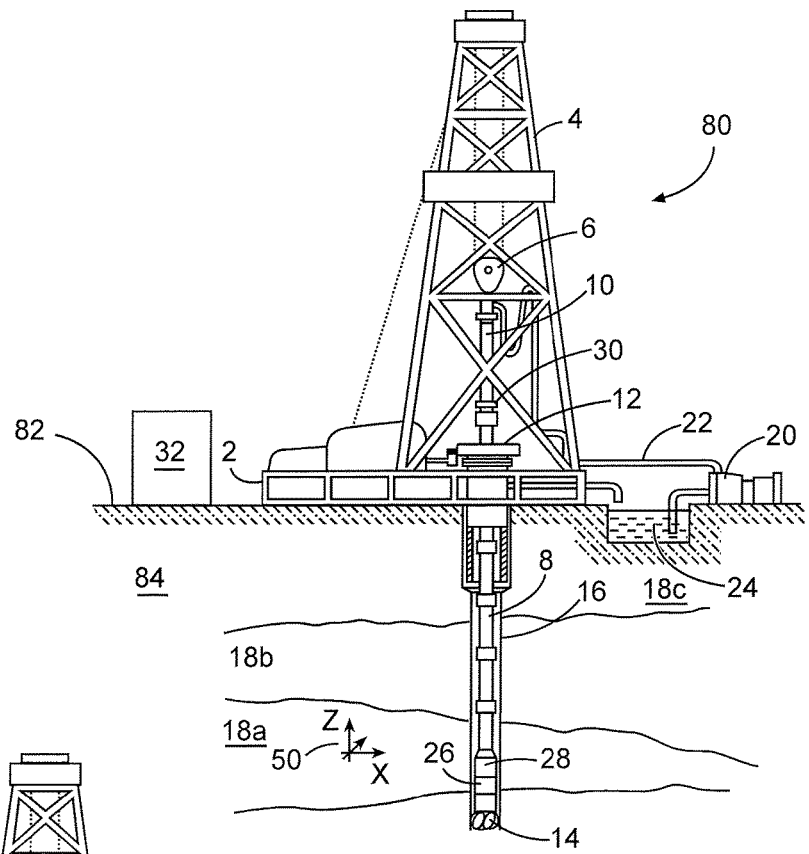
FIG. 8 is a diagram showing an illustrative logging while drilling environment, according to aspects of the present disclosure.

FIG. 8 is a diagram of a subterranean drilling system 80 incorporating a downhole tool 26 with at least one multi-layer sensor, according to aspects of the present disclosure. The drilling system 80 comprises a drilling platform 2 positioned at the surface 82. In the embodiment shown, the surface 82 comprises the top of a formation 84 containing one or more rock strata or layers 18a-c, and the drilling platform 2 may be in contact with the surface 82. In other embodiments, such as in an off-shore drilling operation, the surface 82 may be separated from the drilling platform 2 by a volume of water.

The drilling system 80 comprises a derrick 4 supported by the drilling platform 2 and having a traveling block 6 for raising and lowering a drill string 8. A kelly 10 may support the drill string 8 as it is lowered through a rotary table 12. A drill bit 14 may be coupled to the drill string 8 and driven by a downhole motor and/or rotation of the drill string 8 by the rotary table 12. As bit 14 rotates, it creates a borehole 16 that passes through one or more rock strata or layers 18. A pump 20 may circulate drilling fluid through a feed pipe 22 to kelly 10, downhole through the interior of drill string 8, through orifices in drill bit 14, back to the surface via the annulus around drill string 8, and into a retention pit 24. The drilling fluid transports cuttings from the borehole 16 into the pit 24 and aids in maintaining integrity or the borehole 16.

The drilling system 80 may comprise a bottom hole assembly (BHA) coupled to the drill string 8 near the drill bit 14. The BHA may comprise various downhole measurement tools and sensors and LWD and MWD elements, including the downhole tool 26 with at least one multi-layer sensor. As the bit extends the borehole 16 through the formations 18, the tool 26 may collect measurements relating to borehole 16 and formation the resistivity of the formation 84. In certain embodiments, the orientation and position of the tool 26 may be tracked using, for example, an azimuthal orientation indicator, which may include magnetometers, inclinometers, and/or accelerometers, though other sensor types such as gyroscopes may be used in some embodiments.

The tools and sensors of the BHA including the tool 26 may be communicably coupled to a telemetry element 28. The telemetry element 28 may transfer measurements from tool 26 to a surface receiver 30 and/or to receive commands from the surface receiver 30. The telemetry element 28 may comprise a mud pulse telemetry system, and acoustic telemetry system, a wired communications system, a wireless communications system, or any other type of communications system that would be appreciated by one of ordinary skill in the art in view of this disclosure. In certain embodiments, some or all of the measurements taken at the tool 26 may also be stored within the tool 26 or the telemetry element 28 for later retrieval at the surface 82.

In certain embodiments, the drilling system 80 may comprise a surface control unit 32 positioned at the surface 102. The surface control unit 32 may be communicably coupled to the surface receiver 30 and may receive measurements from the tool 26 and/or transmit commands to the tool 26 though the surface receiver 30. The surface control unit 32 may also receive measurements from the tool 26 when the tool 26 is retrieved at the surface 102. As is described above, the surface control unit 32 may process some or all of the measurements from the tool 26 to determine certain parameters of downhole elements, including the borehole 16 and formation 84, and may also generate visualizations of the borehole 16 and formation 84 based, at least in part, on the determined parameters through which features of the downhole elements, such as cracks and fractures, may be identified.

Figure 9:
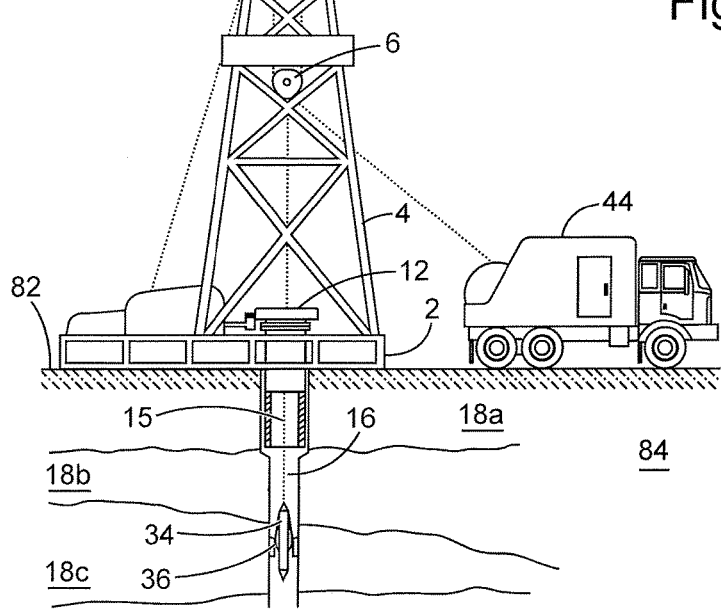
FIG. 9 is a diagram showing an illustrative wireline logging environment, according to aspects of the present disclosure.

At various times during the drilling process, the drill string 8 may be removed from the borehole 16 as shown in FIG. 9. Once the drill string 8 has been removed, measurement/logging operations can be conducted using a wireline tool 34, i.e., an instrument that is suspended into the borehole 16 by a cable 15 having conductors for transporting power to the tool and telemetry from the tool body to the surface 102. The wireline tool 34 may comprise a downhole tool 36 with at least one multi-layer sensor, similar to the tool 26 described above. The tool 36 may be communicatively coupled to the cable 15. A logging facility 44 (shown in FIG. 8 as a truck, although it may be any other structure) may collect measurements from the tool 36, and may include computing facilities (including, e.g., a control unit/information handling system) for controlling, processing, storing, and/or visualizing the measurements gathered by the tool 36. The computing facilities may be communicatively coupled to the tool 36 by way of the cable 15. In certain embodiments, the control unit 32 may serve as the computing facilities of the logging facility 44.

An example method includes positioning a first conformable sensor proximate to a downhole element. The first conformable sensor may include a flexible material, with first and second transmitters and first and second receivers coupled to the flexible material. A first signal may be generated using the first transmitter and a second signal using the second transmitter. A first response of the downhole element to the first signal and a second response of the downhole element to the second signal may be measured at the first receiver. A third response of the downhole element to the first signal and a fourth response of the downhole element to the second signal may be measured at the second receiver. At least the first, second, third, and fourth responses may be combined into a compensated response of the downhole element. The compensated response may be processed to determine a parameter of the downhole element.

In certain embodiments, the downhole element comprises at least one of a borehole, a pipe, or a formation. In certain embodiments, the first and second transmitters comprise an azimuthally aligned transmitter pair, and the first and second transmitters comprise an azimuthally aligned receiver pair. In certain embodiments, the parameter comprises at least one of conductivity, permittivity, thickness, and permeability of the downhole element.

In any of the embodiments described in the preceding two paragraphs, processing the compensated response to determine the parameter of the downhole element may comprise using an inversion algorithm. In any of the embodiments described in the preceding two paragraphs, combining at least the first, second, third, and fourth responses into a compensated response of the downhole element may comprise multiplying two of the first, second, third, and fourth responses to form a first product; multiplying a different two of the first, second, third, and fourth responses to form a second product; and dividing the first product by the second product. In any of the embodiments described in the preceding two paragraphs, positioning the first conformable sensor proximate to the downhole element may comprise extending from a downhole tool a pad to which the first conformable sensor is coupled. In any of the embodiments described in the preceding two paragraphs, the first and second transmitters and the first and second receiver may comprise symmetrical winding patterns. In certain embodiments the first conformable sensor is one or a plurality of conformable sensors coupled to the pad. In certain embodiments, first and second receivers are positioned between the first and second transmitters.

According to aspects of the present disclosure, an example system comprises a downhole tool and a flexible material coupled to the downhole tool. First and second transmitters may be coupled to the flexible material. First and second receivers may be coupled to the flexible material. A processor may be communicably coupled to the downhole tool, wherein the processor is coupled to a memory device containing a set of instructions that, when processed by the processor, cause the processor to receive from the first receiver a first response of a downhole element to a first signal generated by the first transmitter and a second response of the downhole element to a second signal generated by the second transmitter; receive from the second receiver a third response of the downhole element to the first signal and a fourth response of the downhole element to the second signal; combine at least the first, second, third, and fourth responses into a compensated response of the downhole element; process the compensated response to determine a parameter of the downhole element.

In certain embodiments, the downhole element comprises at least one of a borehole, a pipe, or a formation. In certain embodiments, the first and second transmitters comprise an azimuthally aligned transmitter pair, and the first and second transmitters comprise an azimuthally aligned receiver pair. In certain embodiments, the parameter comprises at least one of conductivity, permittivity, thickness, and permeability of the downhole element.

In any of the embodiments described in the preceding two paragraphs, the set of instructions that cause the processor to process the compensated response to determine the parameter of the downhole element may further cause the processor to determine the parameter of the downhole element using an inversion algorithm. In any of the embodiments described in the preceding two paragraphs, the set of instructions that cause the processor to combine at least the first, second, third, and fourth responses into a compensated response of the downhole element may further causes the processor to multiply two of the first, second, third, and fourth responses to form a first product; multiply a different two of the first, second, third, and fourth responses to form a second product; and divide the first product by the second product. In any of the embodiments described in the preceding two paragraphs, the set of instructions that cause the processor to position the first conformable sensor proximate to the downhole element may further cause the processor to extend from a downhole tool a pad to which the first conformable sensor is coupled. In any of the embodiments described in the preceding two paragraphs, the first and second transmitters and the first and second receiver may comprise symmetrical winding patterns. In certain embodiments, the first conformable sensor is one or a plurality of conformable sensors coupled to the pad. In certain embodiments, the first and second receivers are positioned between the first and second transmitters.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. Also, the terms in the claims have their plain, ordinary meaning unless otherwise explicitly and clearly defined by the patentee. The indefinite articles "a" or "an," as used in the claims, are each defined herein to mean one or more than one of the element that it introduces.

What is claimed is:

1. A method for downhole surveying and measuring, comprising positioning a first conformable sensor proximate to a downhole element, the first conformable sensor including
  a flexible material;
  first and second transmitters coupled to the flexible material; and
  first and second receivers coupled to the flexible material;
generating a first signal using the first transmitter and a second signal using the second transmitter;
measuring at the first receiver a first response of the downhole element to the first signal and a second response of the downhole element to the second signal;
measuring at the second receiver a third response of the downhole element to the first signal and a fourth response of the downhole element to the second signal;
combining at least the first, second, third, and fourth responses into a compensated response of the downhole element;
processing the compensated response to determine a parameter of the downhole element.

2. The method of claim 1, wherein the downhole element comprises at least one of a borehole, a pipe, or a formation.

3. The method of claim 1, wherein the first and second transmitters comprise an azimuthally aligned transmitter pair, and the first and second transmitters comprise an azimuthally aligned receiver pair.

4. The method of claim 1, wherein the parameter comprises at least one of conductivity, permittivity, thickness, and permeability of the downhole element.

5. The method of claim 1, wherein processing the compensated response to determine the parameter of the downhole element comprises using an inversion algorithm.

6. The method of claim 1, wherein combining the at least the first, second, third, and fourth responses into the compensated response of the downhole element comprises
  multiplying two of the first, second, third, and fourth responses to form a first product;
  multiplying a different two of the first, second, third, and fourth responses to form a second product; and
  dividing the first product by the second product.

7. The method of claim 1, wherein positioning the first conformable sensor proximate to the downhole element comprises extending from a downhole tool a pad to which the first conformable sensor is coupled.

8. The method of claim 7, wherein the first conformable sensor is one or a plurality of conformable sensors coupled to the pad.

9. The method of claim 1, wherein the first and second transmitters and the first and second receiver comprise symmetrical winding patterns.

10. The method of claim 9, wherein the first and second receivers are positioned between the first and second transmitters.

11. A system for downhole surveying and measuring, comprising
  a downhole tool;
  a flexible material coupled to the downhole tool;
  first and second transmitters coupled to the flexible material;
  first and second receivers coupled to the flexible material; and
  a processor communicably coupled to the downhole tool, wherein the processor is coupled to a memory device containing a set of instructions that, when processed by the processor, cause the processor to receive from the first receiver a first response of a downhole element to a first signal generated by the first transmitter and a second response of the downhole element to a second signal generated by the second transmitter;

receive from the second receiver a third response of the downhole element to the first signal and a fourth response of the downhole element to the second signal;

combine at least the first, second, third, and fourth responses into a compensated response of the downhole element; and process the compensated response to determine a parameter of the downhole element.

12. The system of claim 11, wherein the downhole element comprises at least one of a borehole, a pipe, or a formation.

13. The system of claim 11, wherein the first and second transmitters comprise an azimuthally aligned transmitter pair, and the first and second transmitters comprise an azimuthally aligned receiver pair.

14. The system of claim 11, wherein the parameter comprises at least one of conductivity, permittivity, thickness, and permeability of the downhole element.

15. The system of claim 11, wherein the set of instructions that cause the processor to process the compensated response to determine the parameter of the downhole element further cause the processor to determine the parameter of the downhole element using an inversion algorithm.

16. The system of claim 11, wherein the set of instructions that cause the processor to combine the at least the first, second, third, and fourth responses into the compensated response of the downhole element further causes the processor to multiply two of the first, second, third, and fourth responses to form a first product;

multiply a different two of the first, second, third, and fourth responses to form a second product; and divide the first product by the second product.

17. The system of claim 11, wherein the set of instructions that cause the processor to position the first conformable sensor proximate to the downhole element further causes the processor to extend from a downhole tool a pad to which the first conformable sensor is coupled.

18. The system of claim 7, wherein the first conformable sensor is one or a plurality of conformable sensors coupled to the pad.

19. The system of claim 11, wherein the first and second transmitters and the first and second receiver comprise symmetrical winding patterns.

20. The system of claim 19, wherein the first and second receivers are positioned between the first and second transmitters.

\* \* \* \* \*